(12) United States Patent  
Shaw

(10) Patent No.: US 6,732,658 B1
(45) Date of Patent: May 11, 2004

(54) TRANSIT CAR PROPELLED BY MULTIPLE PAIRS OF MAGNETIC LINEAR MOTORS

(76) Inventor: John B. Shaw, 1812 E. Marlette Ave., Phoenix, AZ (US) 85016

( * ) Notice: Subject to any disclaimer, the term of this patent is extended or adjusted under 35 U.S.C. 154(b) by 0 days.

(21) Appl. No.: 10/619,018

(22) Filed: Jul. 14, 2003

(51) Int. Cl.[7] ................................................. B60L 13/00
(52) U.S. Cl. ..................................................... 104/291
(58) Field of Search ................................. 104/291, 292, 104/293, 294, 290, 243, 245; 105/72.2, 182.1

(56) References Cited

U.S. PATENT DOCUMENTS

| | | | |
|---|---|---|---|
| 573,823 A | * 12/1896 | Leffler | 104/291 |
| 3,518,364 A | * 6/1970 | Machefert-Tassin | 105/49 |
| 3,548,751 A | * 12/1970 | Bykov et al. | 104/291 |
| 3,845,721 A | * 11/1974 | Wagner | 104/291 |
| 3,847,089 A | * 11/1974 | Nelson | 104/291 |
| 3,877,387 A | * 4/1975 | Kasai et al. | 105/49 |
| 4,440,092 A | * 4/1984 | Sobolewski | 104/291 |
| 4,593,625 A | * 6/1986 | Shimizu et al. | 105/182.1 |
| 5,117,136 A | * 5/1992 | Kobayashi et al. | 310/12 |
| 5,123,357 A | 6/1992 | Fujita et al. | |
| 6,129,028 A | * 10/2000 | Shaw | 105/72.2 |

* cited by examiner

*Primary Examiner*—Mark T. Le
(74) *Attorney, Agent, or Firm*—Frank J. McGue

(57) ABSTRACT

A method of propelling a transit vehicle steered by a centerline electrified structural guidebeam located between two special steel load-bearing rollway beams, using magnetic linear motors suspended between each pair of steerable load-bearing wheels, to react inductively on the rollway beams, to produce tractive effort by four linear motors mounted under an eight wheel car.

4 Claims, 2 Drawing Sheets

TRANSIT CAR PROPELLED BY MULTIPLE PAIRS OF MAGNETIC LINEAR MOTORS

TECHNICAL FIELD

This invention relates in general to public transportation vehicles and more particularly to electric commuter cars and regional rapid transit cars.

BACKGROUND OF THE INVENTION

The majority of the electrically powered transit systems of the world use conventional rotating electric motors to provide the motive force to propel the train. The basic method used to transmit the shaft work of the electric motor to the axle-mounted driving wheels of the massive swiveling bogies is a heavy encased set of lubricated reduction gears riding on the axles.

In modern inter-city and regional commuter passenger coaches, a Diesel engine is attached to a transmission housing containing a hydraulic torque amplifier, a set of reversible reduction gears, and a hydraulic retarder. This combination drives the wheels through axle mounted final reduction gears. Both of these drive systems are heavy, costly, and require expensive maintenance and downtime procedures. The diesel exhaust gases contribute to atmospheric and surface contamination.

Thus there is a need for a new and more efficient means of propelling a light-weight vehicle on a high-strength elevated structural rollway above all surface obstacles.

Further, there is a need for motors that have no drive-line gears, no heavy final reduction gears, and are not axle-mounted in massive swiveling bogies.

Lastly, there is a need for multiple pairs of motors that have an associated computer system that integrates all variable operating conditions required for the most efficient energy consumption consistent with good passenger service and vehicle performance.

None of the known prior art disclose such linear motors and computer combination as set forth herein. The present invention as delineated meets these needs.

This invention with its many innovations provides an improved transportation vehicle that uses two magnetic linear motors at each end of the rigid vehicle which inductively react with the special steel rollway surfaces to develop the propulsion force.

This invention provides a major design modification to existing conventional passenger vehicle understructure propulsion equipment, to reduce cost, weight, and increase productivity.

SUMMARY OF THE INVENTION

It is an object of this invention to form a simple design having a three-phase magnetic linear motor suspended by, and between pairs of individually load-supporting, non propulsive, resiliently cushioned, central guide-beam steered wheels.

It is a further object of this invention to form a comprehensive design, having many computer controlled means of electrically responding to digitally integrated programs, track-side signals, and central dispatcher modifications.

It is also a further object of this invention, to provide a vehicle that is quiet, has a smooth rapid acceleration, needs less maintenance, and requires a reduced total investment of travel infrastructures and land acquisition costs.

The concept of this design is to create a public transportation vehicle that has no revolving mechanical power devises used in propelling the vehicle along its rollway. A single electromagnetic linear motor is rigidly suspended between each steerable pair of load-bearing wheels that roll on the flat surfaces of a steel structural guideway. The linear motor assembly is secured in a carrier frame bolted to locating arms extending from the axle arms over the inter-axle support beam, with adjustable means to maintain a specific "air-gap" clearance between the motor and the rollway surface.

Forced air is ducted to many small channels created in the insulated coil-windings and laminations of the linear motor to cool it and exclude dirt and debris. The linear motors provide an accelerating and retarding function that is greater than that of existing power wheel adhesions, because they are completely independent of weather conditions such as rain, glaze-ice and snow.

BRIEF DESCRIPTION OF THE DRAWINGS

The present invention may be more readily described by reference to the accompanying drawing in which.

DESCRIPTION OF THE PREFERRED EMBODIMENT

Figure 1:
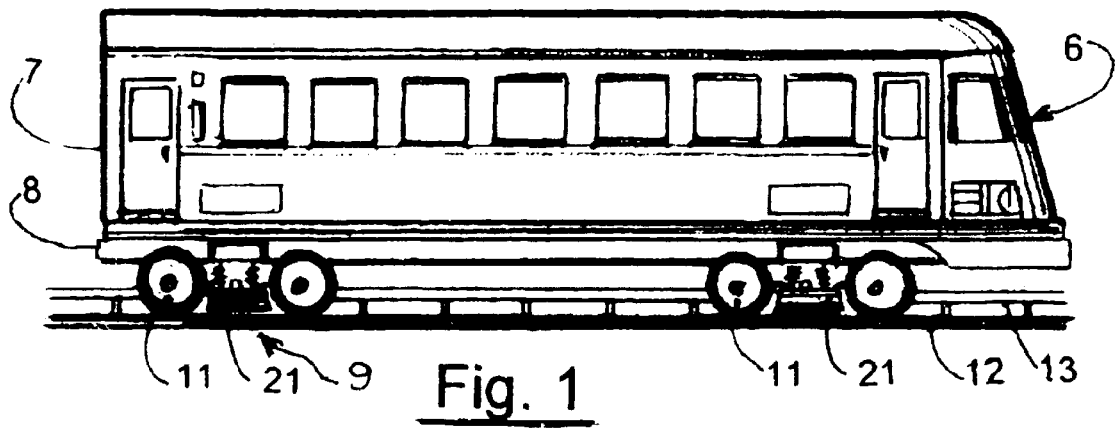
FIG. 1 is an elevation of a typical passenger transit vehicle showing the locations of each pair of magnetic linear motors at each end of the vehicle.

Referring to FIG. 1, depicts a transit vehicle 6 having a passenger load containing body 7 secured to an underframe structure 8 with a quadruplex 9 having two pairs of load-bearing group-steered wheels 11 supporting each end of transit vehicle 6 for travel along a steel rollway 12. Transit vehicle 6 is positively guided by a rigid laser-aligned structural steel guide-beam 13 centered between a pair of widely spaced, laser-leveled special steel structural rollway beams 12. A linear motor 21 is located between each pair of wheels 11 and provides a tractive and reactive magnetic force on rollway 12 thereby propelling transit vehicle 6.

Figure 2:
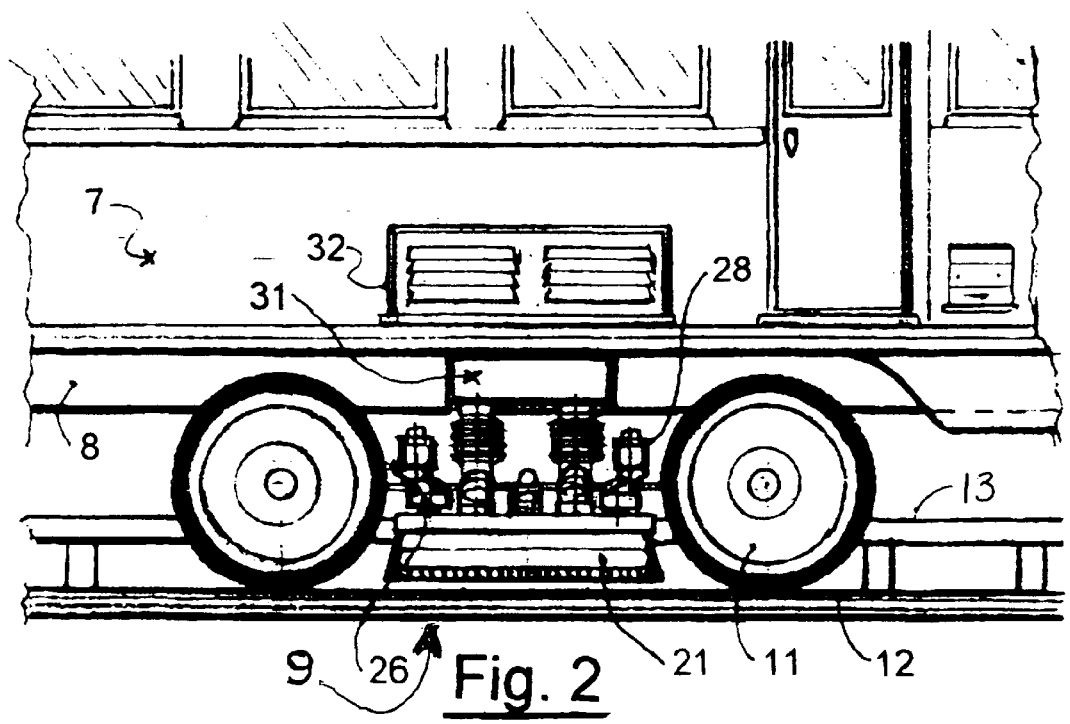
FIG. 2 shows a 4-wheel end group with a linear unit suspended between a pair of steerable load bearing wheels riding on an electromagnetic steel roll-way.

As best seen in FIG. 2, a lower end of transit vehicle 6 shows magnetic linear motor 21 suspended between each pair of wheels 11 by two arms 26 having two horizontal thrust transmitting collared electrical jack-screws 28 mounted on an inter-axle support beam 23 (not shown) for precise maintenance of the magnetic air-gap spacing (7 to 10 mm.) between linear motor 21 and structural special steel rollway beams 12.

Cooling and purge air is flexibly ducted to linear motor 21 encasement from a positive displacement blowers 33 receiving air from an intake cleaner and drier 34.

Figure 3:
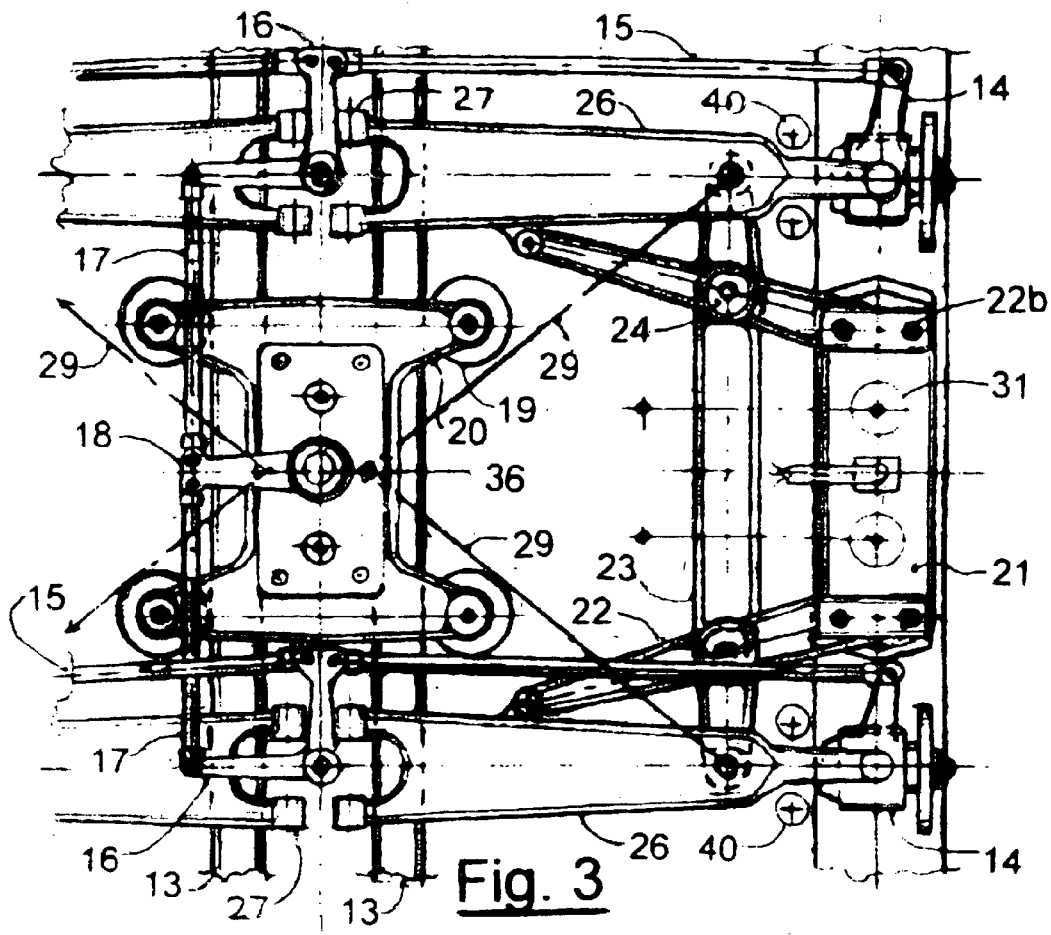
FIG. 3 shows a below-the-floor plan view of one half of a four-wheel group assembly of the structural apparatus required to harness a linear motor to the radial axle arms of the pivotal wheel-hub bearing supports. (wheels removed)
Figure 4:
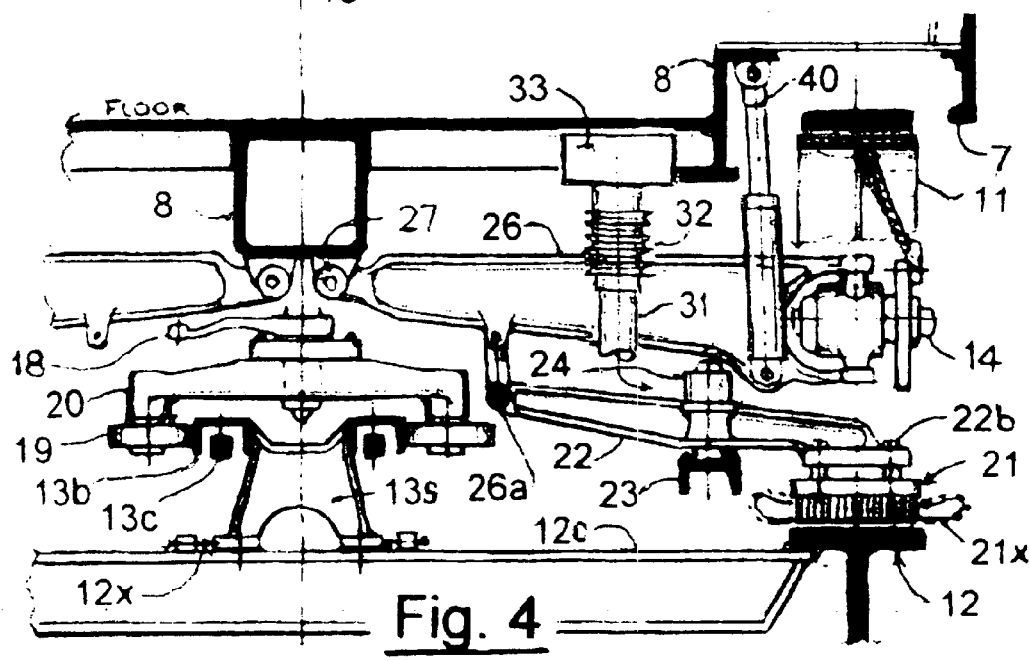
FIG. 4 shows a horizontal view of the method of adjustably supporting the linear motor to the radial axial arms of the load bearing wheels.

Best seen in FIGS. 3 and 4 is quadruplex 9 which guides, supports and propels the transit vehicle 6. In FIG. 3, wheels 11 have been removed to clearly show quadruplex 9 support for linear motor 21 from radial axle arms 26.

As shown, pivotal wheel bearing hubs 14 are steered by lateral rods 15 from a bell-crank lever 16 centered between axle arm anchoring pivots 27 secured to the underside of structural frame 8 (not shown in FIG. 3). Each bell-crank 16 is connected by a side rod 17 to a power-steering arm 18 actuated by a demountable guide follower 20 having two pairs of side wheels 19 that side-ride center guide-beam 13. This mechanism is completely set forth in U.S. Pat. No. 6,129,028 which issued Oct. 10, 2000 to the present inventor.

Magnetic linear motor 21 is supported by two locating arms 22 that have four spring loaded lateral leveling motor mounting screws 22b. Locating arms 22 are pivoted from a hub 26a extended below the axle arms 26. The weight and thrust of linear motor 21 is transferred to an inter-axle support beam 23 by means of two computer adjustable collared jack-screws 24 that maintain the desired magnetic air-gap clearance.

Two sets of diagonal rods 29 connect axle arms 26 to a central anchorage pivot 36 on underframe structure 8 and thereby transfer thrust forces induced by linear motor 21 to underframe structure 8 as it accelerates transit vehicle 6.

A proportion of the weight of transit vehicle 6 vertically imposed on each axle arm 26 is transmitted directly down from underframe structure 8 by a pair of hydro-pneumatic shock absorbing-leveling cylinders 40. Hydraulic and parking brakes are conventional, but not delineated in this invention specifics of design.

Continuous roll-way 12 is made of a special alloy steel with enhanced electromagnetic qualities and has spaced cross-beams 12c and adjustable mountings 12x for laser lateral alignment of the guide-beam 13. A support bracket 13s is welded to two guide-beam channel bars 13b and that contain two insulator supported "third-rail" conductor bars 13c.

Linear motor 21 is supported by locating arms 22 which are pivoted from axle-arms 26 and extend over inter-axle support beam 23. Collared electric jack-screws 24 thrusting down on the support beam 23 maintain the magnetic "air-gap" clearance of linear motor 21 above the surface of the rollway 12.

One quarter of the total weight of the end of transit vehicle 6 is carried on the dual hydro-pneumatic shock-cushion leveling cylinders 40 which are mounted under the wheel pivot yoke of axial arm 26 and up to underframe structure 8. A computer (not shown) reads a series of level indicators to vary the fluid levels therein to accurately align the car floor with the station platforms.

A cooling air duct 31 having a vertical expansion bellow-ring 32 extend below positive displacement blowers 33 to linear motor 21. Air from intake cleaner and drier 34 is rain screened, filtered and dried before entering blowers 33. The windings, insulation and laminations of linear motors 21 are encapsulated with moisture-proof plastic. For maximum protection, a exterior coil windings 21x of linear motor 21 are encased with rigid kevlar jackets.

Quick motor dismounts 22b are in combination with well-known drop-pit apparatus facilitates service repair or replacement of linear motor 21.

Several advantages of the present invention are apparent: Total weight is reduced by the elimination of massive bogies with heavy axle mounted traction motors geared to drive heavy steel wheel sets. Acceleration and dynamic braking efforts require no friction contact to rollway 12. Linear motors 21 provide greater rates of acceleration than slipping drive-wheels, and better rates of acceleration and deceleration increase average speed between stations. Riding quality is improved because the unsprung weight is a greatly reduced percent amount of the total weight. The hydro-pneumatic cushion cylinders provide a softer ride. The wide-body vehicle rides on non-steel, non-pneumatic quiet polyurethane treaded wheels 11 rolling on laser-leveled steel surface rollway 12 preferably spaced at 2.5 meters (8 ft-3 in.) for great lateral stability on turns at high speeds.

Although but one embodiment of the invention has been shown and described, it will be obvious to those skilled in the art, that various changes and modifications may be made therein without departing from the spirit of the invention and the scope of the appended claims.

That which is claimed is:

1. An eight-wheel transit vehicle having a rigid underframe comprises:
   at each end of the vehicle, a centrally pivoted four wheel center-line electrified guide-bean follower, which steers as a group four load-bearing wheels mounted on four center underframe-pivoted axle arms under each end of the transit vehicle,
   a magnetic linear motor suspended between each pair of wheels by two locating arms pivoted from their adjacent axle arms and imposing the motor weight and thrust on an interaxle support beam attached under the axle arms thereby transferring the magnetic linear motor induced acceleration force from the axle arms through diagonal rods to the vehicle underframe to cause vehicle travel along a rollway.

2. The structure of claim 1 whereby an air-gap clearance between each linear motor and a rollway surface is computer measured and mechanically adjusted and continually computer maintained by collared jackscrews mounted on the locating arms above the interaxle support beam.

3. The structure of claim 1 the rollway comprises a central electrified guide-beam in combination with and between two widely spaced rollway surfaces that provide an electromagnetic secondary for the magnetic linear motors electromagnetically induced varying vertical and directional forces concomitantly increasing the total weight-carrying function of the four load-bearing wheels at each end of the vehicle.

4. The structure of claim 1 wherein positive displacement air compression is forced through created interstices and channels in insulated coil-windings and laminations of the linear motors for heat rejection, then exhausting to decrease dirt and debris on rollway surfaces.

* * * * *